United States Patent [19]

Sandell

[11] Patent Number: 5,562,357
[45] Date of Patent: Oct. 8, 1996

[54] SNAP-FIT BALL JOINT

[75] Inventor: Donald R. Sandell, San Jose, Calif.

[73] Assignee: Larry C. Y. Lee, Hayward, Calif.

[21] Appl. No.: 288,128

[22] Filed: Aug. 10, 1994

[51] Int. Cl.⁶ .................................................. F16C 11/06
[52] U.S. Cl. ........................ 403/122; 403/132; 403/133; 403/135
[58] Field of Search .................................. 403/122, 133, 403/135, 132

[56] References Cited

U.S. PATENT DOCUMENTS

| 3,367,728 | 2/1968 | Labbie | 403/122 X |
| 4,527,925 | 7/1985 | Bauer et al. | 403/143 |
| 4,590,819 | 5/1986 | Spease et al. | 403/122 X |
| 4,695,181 | 9/1987 | Rahmede et al. | 403/133 X |
| 4,914,777 | 4/1990 | Cartellone | 403/122 X |
| 4,995,755 | 2/1991 | Hyodo et al. | 403/133 |
| 5,132,492 | 7/1992 | Wieder | 174/65 R |
| 5,368,408 | 11/1994 | Shimizu et al. | 403/133 X |

FOREIGN PATENT DOCUMENTS

| 1029601 | 6/1953 | France | 403/122 |
| 2304818 | 10/1976 | France | 403/122 |
| 2568958 | 2/1986 | France | 403/122 |
| 2404853 | 8/1974 | Germany | 403/133 |
| 176091 | 7/1961 | Sweden | 403/133 |
| 968516 | 10/1982 | U.S.S.R. | 403/122 |
| 886571 | 1/1962 | United Kingdom | 403/133 |
| 1364631 | 8/1974 | United Kingdom | 403/122 |
| 2106173 | 4/1983 | United Kingdom | 403/122 |

Primary Examiner—Terry Lee Melius
Assistant Examiner—Christopher J. Novosad
Attorney, Agent, or Firm—Elliot B. Aronson

[57] ABSTRACT

A snap-fit plastic ball joint that may be molded using a plurality of shutoffs on inner and outer mold pieces without the need for a solid or collapsible ball-shaped core. The ball joint includes a socket and a plurality of molded plastic retaining fingers disposed around the perimeter of the socket and extending away from the socket. The retaining fingers extend longitudinally along a ball seated in the socket and are formed to engage the ball and retain it in its seated position. The socket itself is formed by a plurality of seating fingers that are disposed around the socket alternating with a plurality of web members. The web members form extensions of the retaining fingers. The alternating seating fingers and web members are joined at their neighboring edges to define the socket. The seating fingers are shaped at their distal ends to define a concave seat for seating the ball of the ball joint and the web members provide support for the seating fingers.

3 Claims, 3 Drawing Sheets

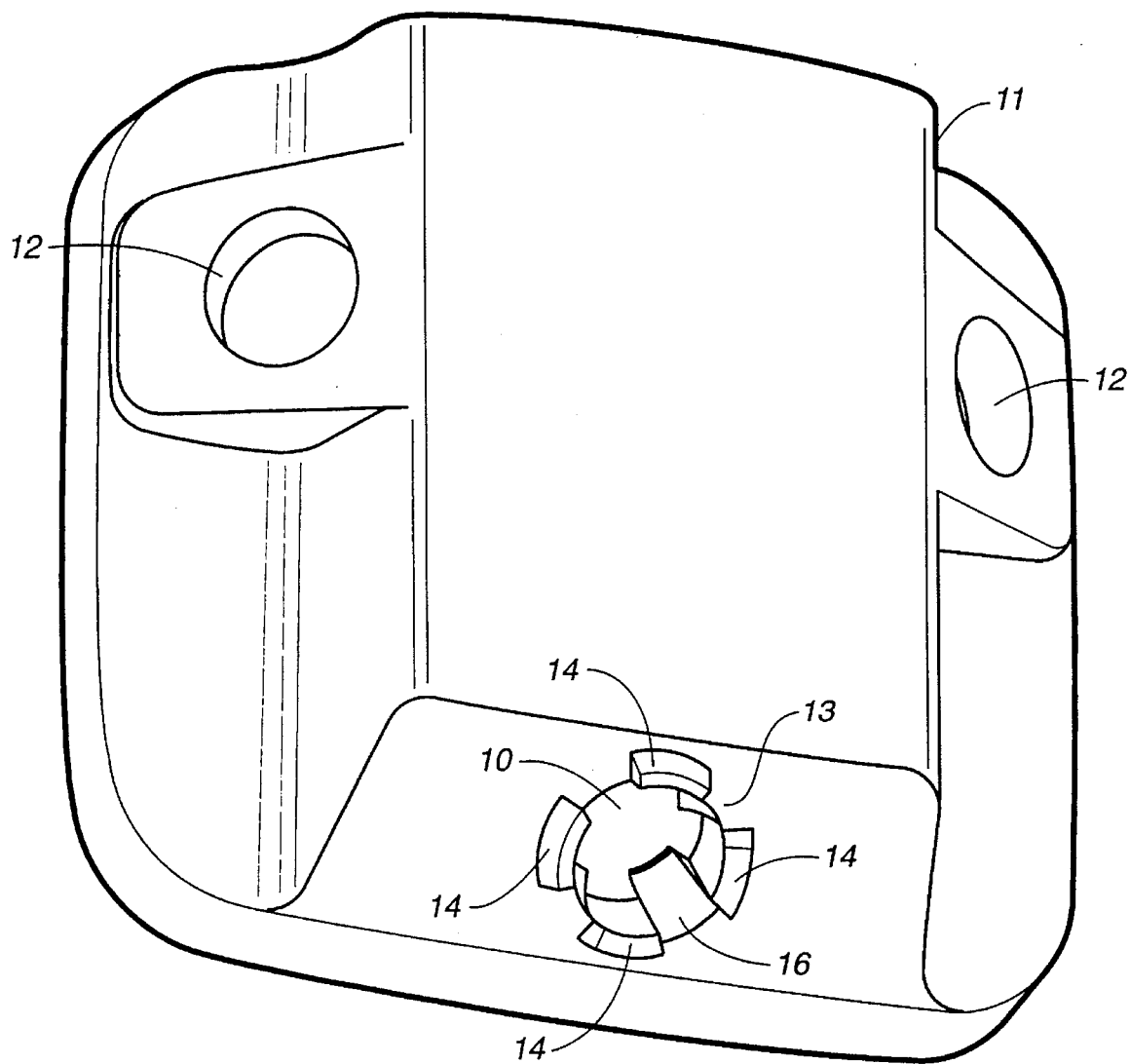
FIG._1

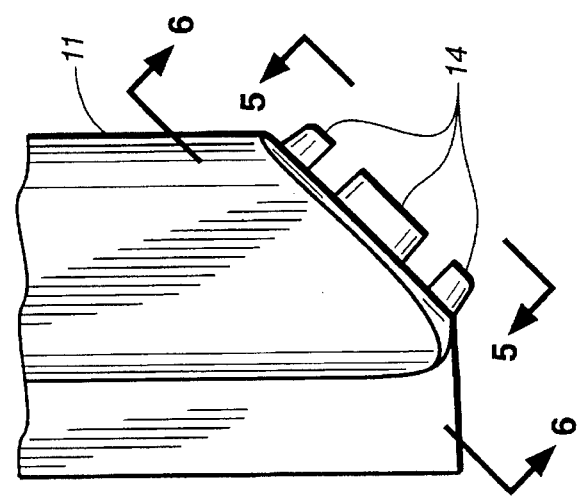
FIG._4
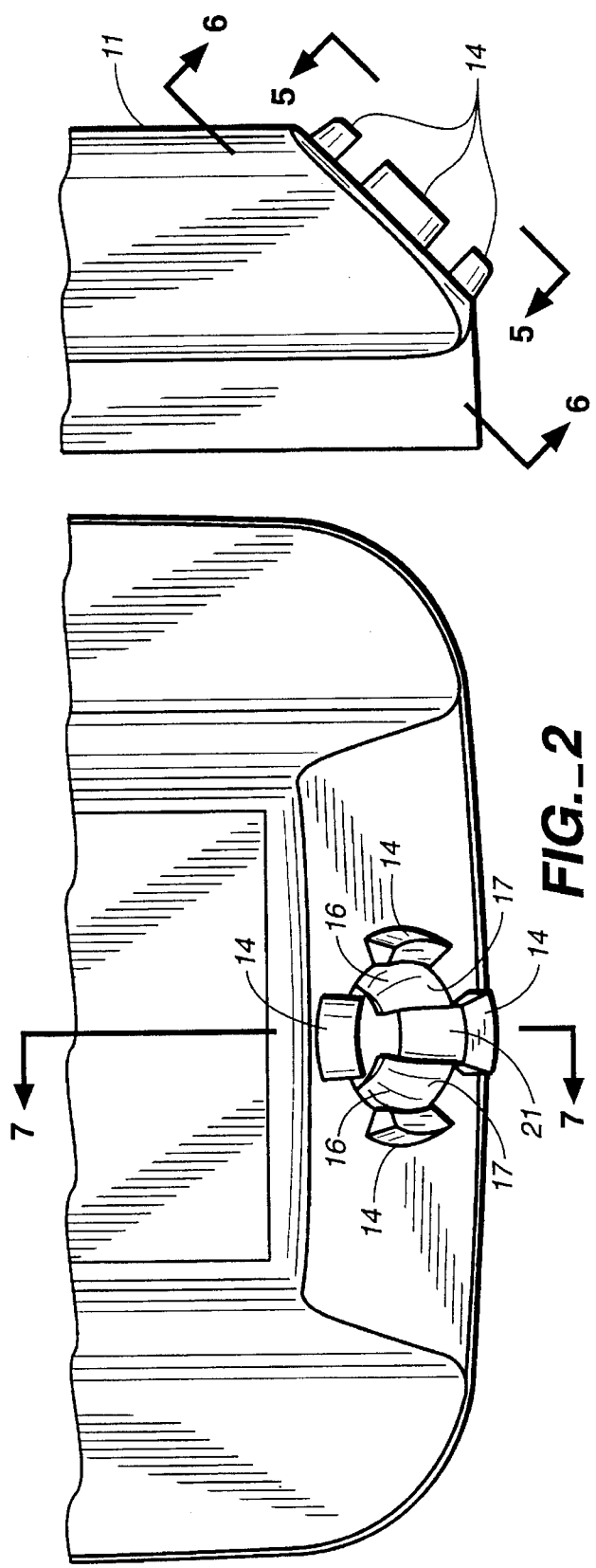
FIG._2
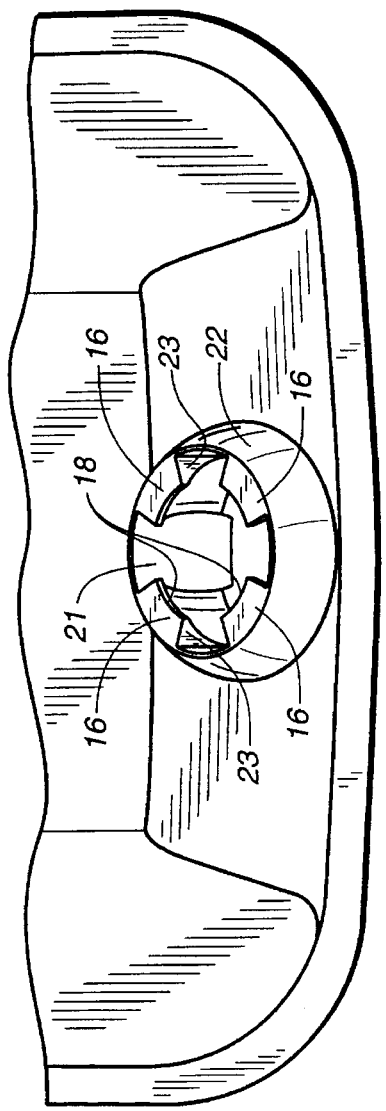
FIG._3

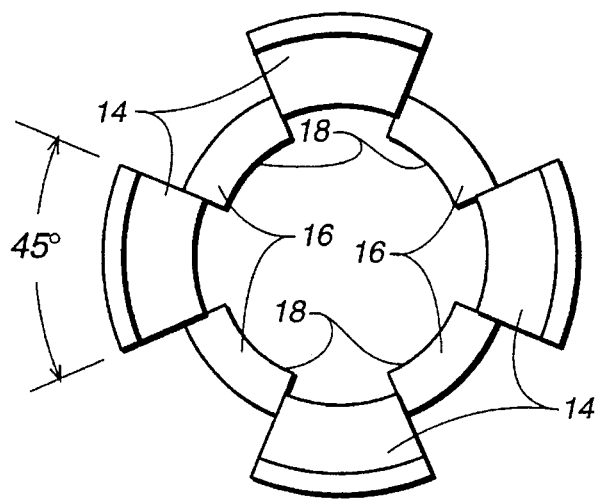
FIG._5
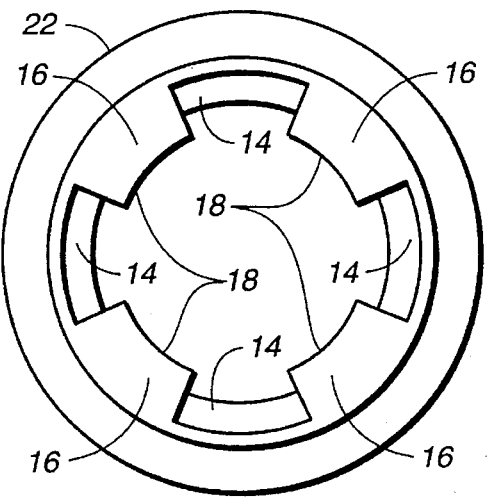
FIG._6
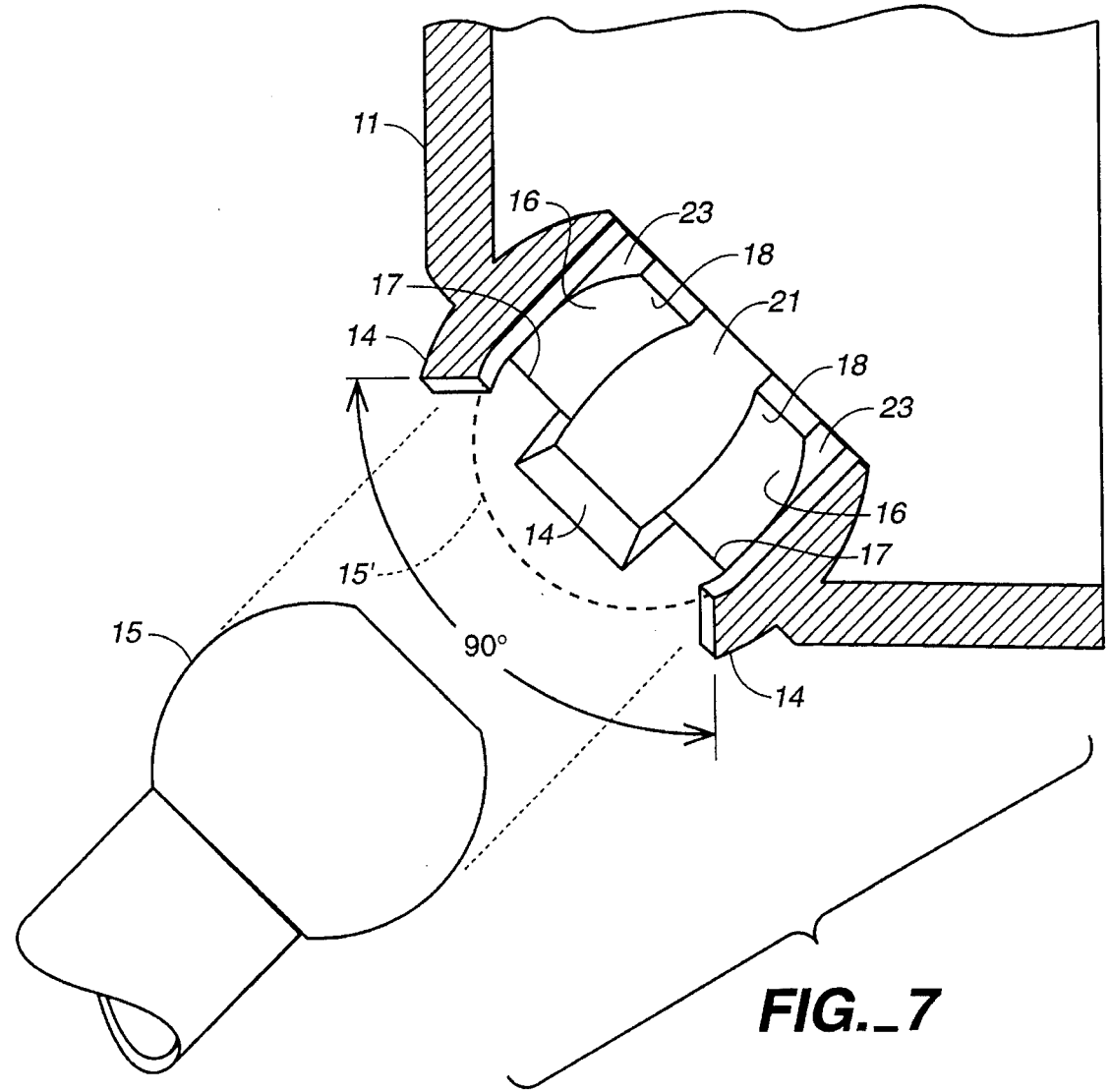
FIG._7

SNAP-FIT BALL JOINT

BACKGROUND OF THE INVENTION

The present invention relates to ball joints and is more particularly directed to molded plastic ball joints.

In a ball joint a ball moves within a socket so as to allow rotary motion in all directions within certain limits. Such joints are found in many consumer, commercial and industrial products where a range of movement is desired. By way of illustration, they are often used in occupancy detection devices of the sort that turn on a light in response to the presence of a person or other target object. A sensor head containing electronics for detecting the presence of the target object is connected to a mounting base through a ball joint that allows the sensor head to be aimed in a desired direction after the base is mounted in position.

In many products, and particularly mass produced products, the ball joint and product housing are often made of plastic. In one form of plastic ball joint, for example, a plastic socket or cup is formed having a generally hemispherical shape. A ball, positioned on the end of a support arm, is seated in the socket and is held there by several plastic fingers. The fingers extend forward from the margin of the hemispherical socket and are shaped to engage the ball and urge it into the socket. The fingers have sufficient give to permit the ball joint to be assembled by pressing the ball into the socket past the fingers, which deform slightly to permit the ball to snap into the socket and then have sufficient residual strength to retain the ball in the socket.

The problem with this arrangement is that the known ways for molding the plastic socket and fingers impose undesirable compromises. For example, to mold the socket and fingers as an integral unit, the mold may include a ball-shaped core to define the inner surfaces of the socket and fingers. When the mold is separated, the ball-shaped core is pulled out of the socket past the newly formed fingers (opposite to the manner in which a ball will later be urged into the socket when the ball joint is assembled). This action stresses the fingers. Thus when this method is used, all fingers are necessarily stressed at least twice (once to remove the core, a second time during assembly to install the ball). This tends to weaken the fingers, resulting in a greater failure rate and thereby lowering the effective yield of acceptable assembled ball joints. As a result, a greater number of fingers will be broken or found otherwise unacceptable, thereby lowering the effective yield of acceptable assembled ball joints. This problem can be circumvented by using a collapsible core in the molding process, but that is more expensive and less convenient. Alternatively, the fingers may be formed as a separate assembly from the socket and later mounted on the socket, but this increases the part count, complicates the assembly process, and ultimately increases the cost. Other methods for forming the ball joint call for similar tradeoffs of cost, convenience, and additional stressing of the fingers.

SUMMARY OF THE INVENTION

The present invention provides a snap-fit plastic ball joint that overcomes the above tradeoffs. The socket and fingers according to the invention may be integrally formed in a comparatively low-cost manner without additionally stressing the fingers in the process and without increasing the number of parts or the steps needed to assemble the ball joint.

Briefly, a ball joint according to the invention includes a socket and a plurality of molded plastic retaining fingers disposed around the perimeter of the socket and extending away from the socket. As in known plastic ball joint construction, the retaining fingers extend along a ball seated in the socket and are formed to engage the ball and retain it in its seated position. According to the invention the socket itself is formed by a plurality of seating fingers that are disposed around the socket alternating with a plurality of web members. The web members form extensions of the retaining fingers. The alternating seating fingers and web members are joined at their neighboring edges to define the socket. The seating fingers are shaped at their distal ends to define a concave seat for seating the ball of the ball joint and the web members provide support for the seating fingers. A ball joint formed in this manner achieves the above-mentioned advantages of the invention because it may be molded using a plurality of shutoffs on inner and outer mold pieces without the need for a solid or collapsible ball-shaped core.

Other aspects, advantages, and novel features of the invention are described below or will be readily apparent to those skilled in the art from the following specifications and drawings of illustrative embodiments.

BRIEF DESCRIPTION OF THE DRAWINGS

FIG. 1 is a perspective view of a ball socket according to the invention formed in a mounting base.

FIG. 2 is a front elevational view of the socket and a portion of the mounting base in FIG. 1.

FIG. 3 is rear elevational view of the socket and mounting base portion of FIG. 2.

FIG. 4 is a side elevational view of the socket and mounting base portion of FIG. 2.

FIG. 5 is an elevational view of the socket along the direction 5—5 shown in FIG. 4.

FIG. 6 is an elevational view of the socket along the direction 6—6 shown in FIG. 4.

FIG. 7 is a cross-sectional view of the socket along the line 7—7 shown in FIG. 2 with a ball in position to be inserted into the socket.

DETAILED DESCRIPTION OF ILLUSTRATIVE EMBODIMENTS

FIG. 1 shows an embodiment of a socket 10 for a ball joint according to the invention formed in a base 11. For the sake of illustration base 11 is shown as a mounting base for an occupancy detector, although the specific form and purpose of the base are not important to the invention. In an occupancy detector the ball joint connects a separate sensor head (not shown) containing an occupancy sensor and electronics to base 11 to permit the sensor head to be aimed in an adjustable direction. Lampholders (not shown) for lights activated by the occupancy detector are secured to base 11 at locations 12. Using the construction of the present invention socket 10 and at least the portion of base 11 supporting the socket may be injection-molded of plastic as an integral unit in a particularly convenient and cost effective way.

Socket 10 is formed in a face 13 of base 11. Around the perimeter of the socket opening are a plurality of retaining fingers 14, which extend outward from the socket face 13. Fingers 14 are shaped to extend a short longitudinal distance along a ball seated in the socket and engage the ball so as to urge it into its seated position for the purpose of retaining the ball in the socket during use. (A ball 15' in seated position is shown diagrammatically in phantom in FIG. 7, and the slight bend in fingers 14 may be seen holding the ball in its seat.) Although FIG. 1 illustrates four fingers 14, other numbers of fingers may also be used. As shown in FIG. 1 fingers 14 are formed integrally with socket 10 and base 11.

At this point the problem faced by the prior art may be more readily appreciated. In molding the retaining fingers 14 together with sockets of the prior art, a ball-shaped mold member connected to the outer mold member defines the inner surfaces of the socket and fingers. When the mold pieces are separated, the ball-shaped mold member is then pulled forcibly out of the socket and the fingers 14 deform slightly to allow the ball to pass. This operation stresses and consequently weakens the fingers. In the past, one had to accept the weakened fingers and consequent reduced yields of acceptable product or resort to other less convenient and more costly molding techniques. The present construction, however, makes it possible to form the fingers and socket as an integral unit without stressing the fingers on separating the mold pieces.

This problem is avoided in the improved construction of the present invention by the simple expedient of forming socket 10 from a plurality of seating fingers 16, which are distributed around the socket. The proximal ends 17 of the seating fingers alternate with retaining fingers 14 around the perimeter of the socket. In the embodiment of FIG. 1 four seating fingers alternate with the four retaining fingers 14. Seating fingers 16 are shaped at their distal ends 18 so that the four distal ends define a seat for receiving the ball 15 of the ball joint. See FIG. 7, which shows an exploded view of ball 15 and socket 10. Seating fingers 16 are formed with sufficient thickness at their distal ends that they exhibit substantially little or no flex under the normal action of ball pressing against the seat. In general, they will be somewhat thicker than the ends of retaining fingers 14, which must have sufficient give to permit the ball to be urged into the socket during the assembly process.

To provide added rigidity and stability, the base portions of retaining fingers 14 extend into socket 10 to define a plurality of web members 21. In keeping with the alternation of retaining fingers 14 and seating fingers 16, web members 21 are interposed between adjacent seating fingers and join neighboring seating fingers together. The web members are set back from the seating finger surfaces defining the seat for the ball. The rear surfaces of seating fingers 16 and web members 21 join together in a reinforcing wall 22 circumscribing the socket. (See FIG. 3.) Seating fingers 16 are connected at their sides to their neighboring web members by generally perpendicular sidewalls 23. As can be seen in FIGS. 1, 2, 3 and 7 web members 21 are each formed as a generally continuous extension of a corresponding retaining finger 14. In this manner, the seating fingers and retaining fingers are shaped and formed to frictionally hold the ball in fixed position in the socket during normal use of the ball joint.

A socket and retaining finger arrangement according to the invention may be formed by injection molding without resorting to a solid or collapsible spherical core for the socket. Instead, the present construction may be molded by including four intermeshing pins on each of the inner and outer mold pieces for the integral socket/base disposed so as to create eight shutoffs defining the retaining and seating fingers. Shutoffs are well known in the injection molded plastic arts, and the details of their construction and use need not be given here. The use of shutoffs here is particularly advantageous, however, because it permits the two mold pieces simply to be separated without having to stress any of the fingers in the process of separation. Additionally, the shutoff arrangement is desirable because of the greater ease of manufacturing and comparatively low cost.

A suitable plastic for providing sufficient rigidity and give is ABS. There are numerous alternative plastics that may be used, however. The particular plastic and the particular dimensions of the socket and fingers will depend on such factors as the environment in which the ball joint will be used, the load to be supported, and other externally imposed design criteria. Those of routine skill in the art of injection molding plastic will readily be able to select an appropriate plastic material, determine the appropriate dimensions for any given application, and form the appropriate shutoffs.

The above descriptions and drawings disclose illustrative embodiments of the invention. Given the benefit of this disclosure, those skilled in the art will appreciate that various modifications, alternate constructions, and equivalents may also be employed to achieve the advantages of the invention. Therefore, the invention is not to be limited to the above description and illustrations, but is defined by the appended claims.

What is claimed is:

1. A ball joint including a molded plastic socket for receiving a ball and a plurality of molded plastic retaining fingers disposed around the perimeter of said socket and extending away from said socket, said retaining fingers extending longitudinally along a said ball seated in said socket and being formed to engage said ball so as to retain said ball in its seated position, said ball joint being characterized in that said socket comprises:

a plurality of seating fingers having proximal ends disposed around said perimeter alternating with said retaining fingers and having distal ends shaped to define a concave seat for seating said ball, said seating fingers having a rigidity greater than the rigidity of said retaining fingers, said seating finger rigidity being sufficient to receive said ball without flexing under movement of said ball in said socket; and a plurality of web members forming extensions of said retaining fingers and alternating with said seating fingers;

wherein said alternating seating fingers and web members are joined at their neighboring edges to define said socket, and wherein said seating fingers and retaining fingers are shaped and formed to frictionally hold said ball in fixed position in said socket during normal use of said ball joint.

2. The ball joint of claim 1 wherein said web members are recessed from said seating fingers and joined thereto by substantially perpendicular sidewalls.

3. The ball joint of claim 2 wherein said seating fingers and web members have rear surfaces joined together to define a reinforcing wall circumscribing said socket.

\* \* \* \* \*